Patented July 23, 1935

2,008,750

UNITED STATES PATENT OFFICE 2,008,750

WATER SOLUBLE DIAZOIMINO COMPOUNDS

Miles Augustinus Dahlen, Wilmington, Del., assignor to E. I. du Pont de Nemours & Company, Wilmington, Del., a corporation of Delaware No Drawing. Application July 27, 1932, Serial No. 625,211

8 Claims. (Cl. 260—69)

This invention relates to new water and/or alkali soluble diazoimino compounds suitable for use in dyeing and printing, more particularly it refers to compounds of the following general formula:

Aryl—N=N—R in which aryl represents an aryl nucleus of the benzene, azobenzene, diphenyl, diphenylamine, naphthalene, anthraquinone, or carbazole series containing no solubilizing group, but which may contain groups such as alkyl, alkoxy, halogen, nitro, and benzoyl-amino, and R represents a pyrrolidine nucleus containing at least one solubilizing group in the beta position.

and just enough sodium hydroxide solution to render the solution slightly alkaline to litmus papers. 10 parts of sodium bicarbonate were then added, followed by the addition of the solution of diazotized 2:5-dichloroaniline. The temperature was held at about 10° C. This addition was made carefully, with agitation, due to the foaming resulting from the liberation of carbon dioxide. Further sodium bicarbonate was added when necessary to neutralize all mineral acidity. When the addition was complete, tests for free diazo salt by "spotting" with a coupling agent gave negative results, indicating that the following reaction had been completed:

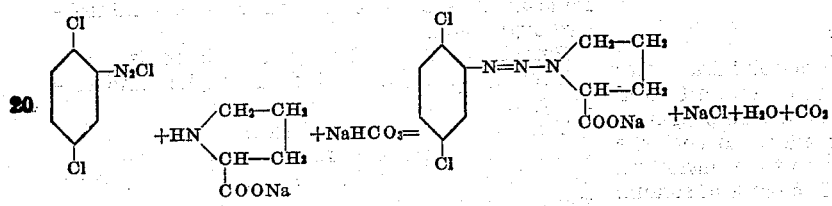
(A)

It is an object of this invention to produce diazoimino compounds which are soluble in water and/or alkali solution and which give valuable dyeings or printings when used in conjunction with the usual ice-color coupling components. Additional objects will appear hereinafter.

These objects are accomplished by the present invention wherein diazo salts of the following general formula:

Aryl—N₂X in which aryl has the same significance as previously mentioned, are coupled with a pyrrolidine derivative containing at least one solubilizing group.

The invention will be more completely understood by reference to the following examples in which the quantities are stated in parts by weight:

Example 1

16.5 parts of 2:5-dichloroaniline were boiled with 100 parts of water containing 50 parts of hydrochloric acid of 20° Bé. The solution was cooled, 200 parts of ice were added, and then 8 parts of sodium nitrite of 95% strength dissolved in 30 parts of water were gradually added. When diazotization was complete, the solution was filtered.

11 parts of proline (pyrrolidine-alpha-carboxylic-acid) were dissolved in 100 parts of water, The diazoimino reaction product (A) was very soluble in water and was isolated by evaporating the solution to dryness, preferably under reduced pressure at a temperature of about 40° C. It was obtained as a light tan solid, mixed with the sodium chloride formed in the diazotization and coupling reactions and other inorganic salts. It was extracted from these impurities by warming with ethyl alcohol, in which it was quite soluble. The salt and most of the inorganic impurities were insoluble and were removed by filtration. The alcoholic solution was again evaporated to dryness to recover the product.

The new diazoimino compound of the above structure was a stable solid, light yellow in color when purified, and was very soluble in water. It was extremely stable toward alkalies and cold dilute solutions of weak acids. However, when heated with acids in aqueous solution, it was hydrolyzed to proline and the diazo salt.

Example 2

The process of Example 1 was repeated, substituting about 16 parts of pyrrolidine-alpha-sulfonic-acid for the proline. The other conditions for diazotizing 2:5-dichloro-aniline and neutralization of the diazo solution, coupling with the pyrrolidine derivative, and isolation and purification of the product were followed. By this process, the following substance was obtained:

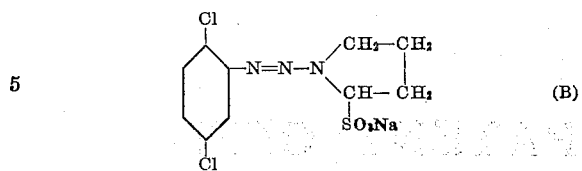

The new diazoimino compound (B) was a light colored solid, very soluble in water, showing a high stability toward alkalies and cold solutions of weak acids. As in the case of product (A), it was readily hydrolyzed to the diazo salt and pyrrolidine-sulfonic-acid by the action of hot dilute acids.

*Example 3*

The process of Example 1 was repeated, substituting about 13 parts of oxy-proline (beta'-hydroxy-pyrrolidine-alpha-carboxylic-acid) for the proline. Following the same diazotization, coupling, isolation and purification procedures, a diazoimino compound of the following probable formula was obtained:

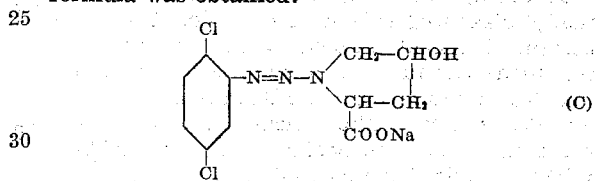

The new diazoimino compound (C) was a light colored solid, very soluble in water, showing properties similar to those of the products (A) and (B) described above.

*Example 4*

76 parts of meta-nitro-para-toluidine were stirred with a mixture of 190 parts of water and 125 parts of hydrochloric acid (specific gravity 1.19) for one hour. Ice was added to cool the mass to 10° C., and the base was then diazotized by the addition of a solution of 35 parts of sodium nitrite in 100 parts of water. The temperature was held at 10° C. during the diazotization operation. When diazotization was complete, the solution was filtered to remove insoluble matter.

55 parts of proline were added to the above diazo solution, and then a 10% solution of sodium hydroxide was slowly added until the mass was exactly neutral to litmus papers. The temperature was held at about 10° C. during this neutralization-coupling operation. When the neutralization was complete, tests for diazotized meta-nitro-para-toluidine were usually negative. If not, additional quantities of proline followed by alkali were added, until the diazo salt was no longer present.

The reaction mass was then evaporated to dryness as in Example 1 and the product was purified by a similar procedure. A yellow solid of the following structure was obtained:

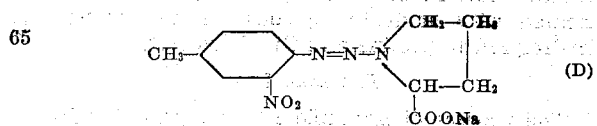

The stability of the new product (D) toward alkalies and cold dilute acids, and its hydrolysis with not acid solutions, were similar to those of the products described above.

It will be readily understood by one skilled in the art that a very large member of new soluble diazoimino compounds is obtainable according to the present invention. For example, a large number of aromatic amines may be diazotized and the diazo salts reacted with the pyrrolidine derivatives. Among such bases, the following representative members may be mentioned:

4-Nitro-2-amino-anisole
4-Chloro-2-amino-anisole
4-Nitro-2-amino-toluene
Ortho-chloro-aniline
Metra-chloro-aniline
4-Chloro-2-nitro-aniline
Ortho-nitraniline
5-Chloro-2-amino-toluene
Dianisidine
Alphanaphthylamine
1-Amino-4-benzoylamino-2:5-dimethoxy-benzene
4-Amino-6-benzoylamino-1:3-dimethylbenzene
4-Amino-azobenzene
Alpha-amino-anthraquinone
2-Nitro-5-methyl-benzene-azo-cresidine
3-Amino-carbazole
4,4'-Diamino-diphenylamine Similarly, in addition to pyrrolidine-alpha-carboxylic acid (proline), pyrrolidine-alpha-sulfonic-acid, and beta'-hydroxy-pyrrolidine-alpha-carboxylic-acid (oxy-proline) disclosed in the above examples, various other pyrrolidines may be used. For example, there may be used:

Pyrrolidine-beta-carboxylic acid
Pyrrolidine-dicarboxylic-acids and poly-carboxylic-acids
Ring alkylated pyrrolidine carboxylic- and sulfonic-acids, such as 4,5-dimethyl-pyrrolidine-2-carboxylic-acid
Pyrrolidine-di- and poly-sulfonic-acids
Poly-hydroxy-pyrrolidine-carboxylic- and sulfonic-acids The aromatic amines used in the present invention should not contain solubilizing groups, for example carboxyl and sulfo groups, but may have substituted thereon groups such as alkyl, alkoxy, halogen, nitro, and benzoyl-amino. The pyrrolidine derivative should have at least one solubilizing group, preferably the carboxylic acid or sulfonic acid group, although other solubilizing groups may be substituted therefor. In general one solubilizing group on the pyrrolidine derivative is sufficient, although in certain cases where greater solubility is desired or where the aromatic amine contains substituents which greatly lower the solubility, it may be desirable to have more than one solubilizing group. In the same way, it may be desirable to vary the solubility by using a metal salt of the pyrrolidine derivative rather than the free acid. This is well known to one skilled in the art and knowing the objects for which the product is to be used no difficulty should be experienced in selecting the proper components.

Coupling of the components may take place in various ways, such as by the addition of the pyrrolidine derivative either before or after neutralization of the excess acidity in the diazo solution, and the pyrrolidine derivative may be either in the form of a free acid or a metallic salt. As a rule it is advisable to effect coupling in a water solution which is either neutral or mildly acidic or alkaline, in the presence of acid-binding agents such as sodium acetate, sodium carbonate and sodium bicarbonate.

The method of isolating the product may also vary. Where the product is very soluble, evaporation to dryness under reduced pressure is preferable. Isolation may also be effected by precipitating the product by the addition of salting agents, such as sodium chloride and sodium sulfate. Where it is desirable to remove inorganic salts from the diazoimino compounds, this may be accomplished by extraction with alcohol, although various other well known methods may also be followed.

The new products are not affected, in general, by strongly alkaline solutions, at ordinary temperatures, although hydrolysis or decomposition may result if the strongly alkaline solution is maintained at an elevated temperature. Similarly, the compounds are, in general, very slowly or not at all hydrolyzed by dilute solutions of weak acids at ordinary temperatures. However, the products will be readily hydrolyzed by dilute acids at elevated temperatures, which is a great advantage in dyeing and printing processes.

These new compounds may be mixed with any of the well-known ice-color coupling components and the textile materials treated therewith, as is described in a copending application. The colors produced by a mixture comprising one of the products of the present invention and an ice-color coupling component are generally fast to washing, light and chlorine and the ease with which they are produced makes them very desirable for use in commercial practice.

As many apparently widely different embodiments of this invention may be made without departing from the spirit and scope thereof, it is to be understood that I do not limit myself to the specific embodiments thereof except as defined in the appended claims.

I claim:
1. A process for producing alkali-soluble diazoimino compounds which comprises coupling a diazotized arylamine with a pyrrolidine compound containing a solubilizing group in the beta-position.
2. A process for producing alkali-soluble diazoimino compounds which comprises coupling a diazotized arylamine of the benzene series, free from solubilizing groups, with a pyrrolidine-beta-carboxylic acid.
3. A process for producing alkali soluble diazoimino compounds which comprises coupling a diazotized member selected from the group consisting of arylamines of the azobenzene, diphenylamine, naphthalene, anthraquinone and carbazole series, 2-5-dichloroaniline, 4-nitro-2-amino-anisole, m-nitro-p-toluidine, m-chloroaniline, 1-amino-4-benzoylamino-2-5-dimethoxy-benzene, ortho-nitraniline, 5-chloro-2-amino-toluene and 4-amino-6-benzoyl-amino-1-3-dimethyl-benzene, with pyrrolidine-beta-carboxylic acid.
4. A process for producing alkali soluble diazoimino compounds which comprises coupling a diazotized aromatic amine of the benzene series, free from solubilizing groups, with pyrrolidine-beta-carboxylic acid.
5. Diazoimino compounds having the following general formula:

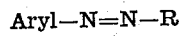

wherein aryl represents the residue of a diazotized arylamine, and R represents the residue of a pyrrolidine compound containing a solubilizing group in the beta-position.
6. Diazoimino compounds having the following general formula:

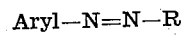

wherein aryl represents the residue of a diazotized arylamine of the benzene series, free from solubilizing groups, and R represents the residue of a pyrrolidine-beta-carboxylic acid.
7. Diazoimino compounds having the following general formula:

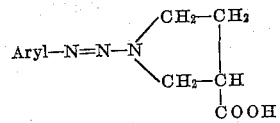

wherein aryl represents the radical of a diazotized arylamine of the azobenzene, diphenylamine, naphthalene, anthraquinone and carbazole series, or the radical of diazotized 2-5-dichloro-aniline, 4-nitro-2-amino-anisole, m-nitro-p-toluidine, m-chloro-aniline, 1-amino-4-benzoylamino-2-5-dimethoxy-benzene, ortho-nitraniline, 5-chloro-2-amino-toluene and 4-amino-6-benzoylamino-1-3-dimethyl-benzene.
8. A diazoimino compound having the following general formula:

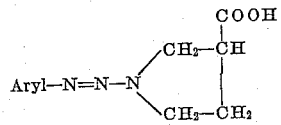

in which aryl represents an aromatic nucleus of the benzene series, free from solubilizing groups.

MILES AUGUSTINUS DAHLEN.

CERTIFICATE OF CORRECTION.

Patent No. 2,008,750.  July 23, 1935.

MILES AUGUSTINUS DAHLEN.

It is hereby certified that error appears in the printed specification of the above numbered patent requiring correction as follows: Page 2, first column, line 72, for "not" read hot; and that the said Letters Patent should be read with these corrections therein that the same may conform to the record of the case in the Patent Office.

Signed and sealed this 17th day of September, A. D. 1935.

Leslie Frazer (Seal)  Acting Commissioner of Patents.